June 23, 1964
L. E. REED ETAL
3,138,291
TANK TRUCK AIR ELIMINATOR SYSTEM
Filed Nov. 23, 1962
2 Sheets-Sheet 1
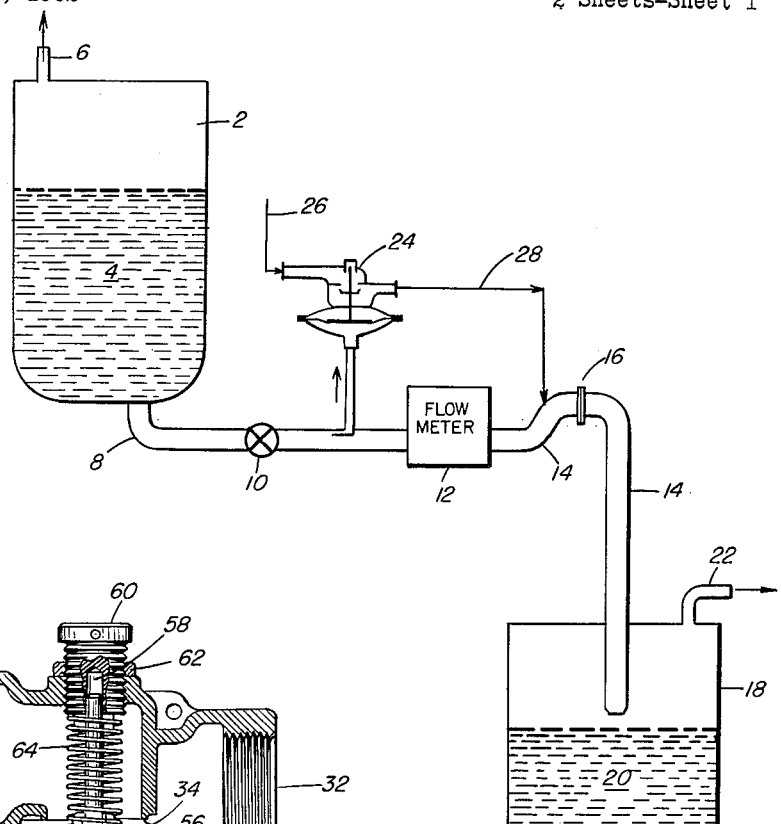
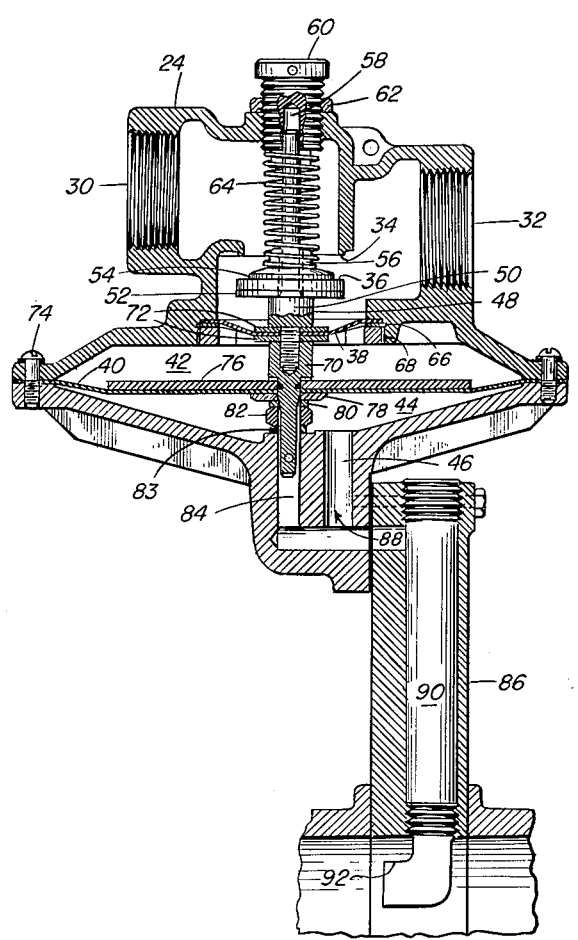
Inventors
Lionel E. Reed
Othello M. Hillman
By
Carl D. Farnsworth
Agent

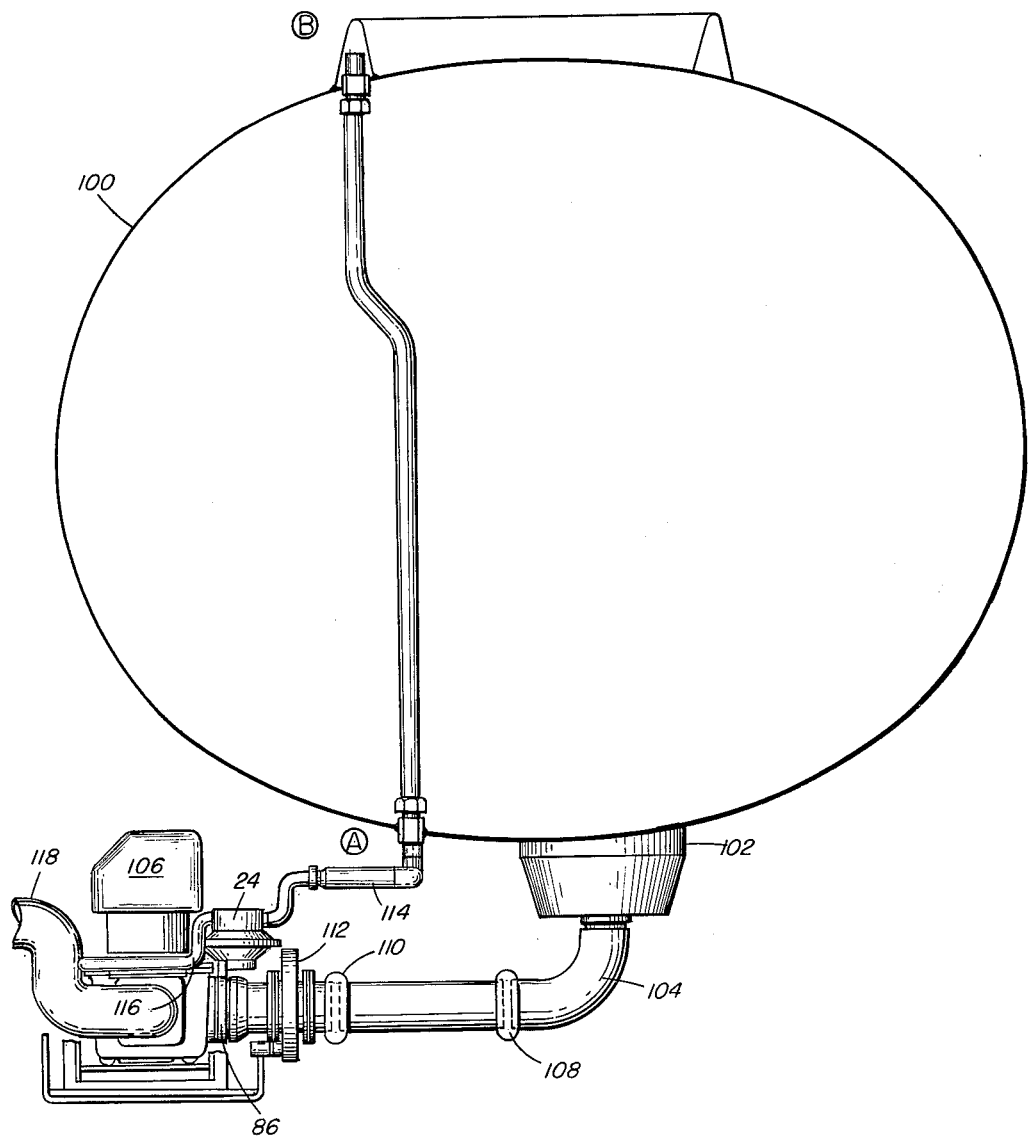
FIG. III

United States Patent Office 3,138,291
Patented June 23, 1964

3,138,291
TANK TRUCK AIR ELIMINATOR SYSTEM
Lionel E. Reed, Greenwich, and Othello M. Hillman, Stamford, Conn., assignors to Socony Mobil Oil Company, Inc., a corporation of New York
Filed Nov. 23, 1962, Ser. No. 239,506
2 Claims. (Cl. 222—72)

This invention relates to the method and means for transferring and dispensing measured quantities of liquid material. In a more particular aspect, the invention relates to a liquid transfer system between a storage tank and a transporting tank or other liquid transfer systems requiring relatively accurate measurement of the transferred liquid.

It is well known at this stage of the art that the presence of a gas or vapor in a flowing liquid will disturb the accuracy of a liquid flow measuring device known as a positive displacement measuring device and this is true whether the system relies on gravity flow and a siphon action or a pump is utilized to establish a negative pressure at the transfer system discharge. In any of these systems a negative pressure is established at the discharge side of the fluid metering system which increases as the tank containing the fluid is being emptied and this negative pressure unless broken when desired will cause the passage of vapor or air with the fluid through the liquid measuring meter unless suitable precautions are taken, thereby causing an inaccuracy in the liquid measurement. In prior art systems, it has been the practice to utilize an air eliminator chamber in combination with a liquid measuring meter to eliminate the passage of air or vapor through the meter. That is a chamber containing an air eliminator device is located ahead of or up stream of the liquid measuring meter, in between the meter and the tank containing the liquid to be dispensed. When a liquid flows from the tank into the system entraining air, the air is collected in an upper integral part of the air eliminator chamber from whence the air is eliminated through a valve actuated by a liquid level float mechanism. Such prior systems tend to be complicated particularly with respect to the means for removing accumulated vapors from the air eliminator and stopping the flow of liquid when the flow of vapor through the liquid measuring meter is imminent.

In order to check or compensate the rising cost of fluid transfer it has become increasingly important particularly in the petroleum industry to increase the rate of handling liquid petroleum products. As a consequence and with the advent of high speed pumps operating at pressures up to 150 pounds per square inch and higher with a flow rate of 1000 gallons per minute and higher, the elimination of and prevention of undesired gases and vapors flowing through the liquid meter of the transfer system has presented problems of great magnitude and importance. At relatively high pressures and high liquid flow rates referred to above, air separation and elimination equipment of the prior art systems are completely inadequate for handling modern rates of fluid delivery. That is, when the liquid supply tank becomes empty in these high flow rate liquid transfer systems huge quantities of air may be introduced rapidly and instantaneously into the system and through the liquid measuring meter unless properly handled. An air separator or eliminator and its air release system of the prior art is generally incapable of handling such an immediate rapid surge of air therethrough.

An object of this invention is to provide a simplified high volume liquid transfer system which prevents transfer of undesired gaseous material with the liquid through the transfer system.

Another object of this invention is to provide a liquid transfer system which overcomes the disadvantages of an air eliminator and associated pressure release system of the prior art.

A further object of this invention is to provide a liquid transfer system control means which will eliminate vortexing of the liquid introduced to the transfer system.

Still another object of this invention is directed to providing a liquid transfer system which will automatically reduce the flow of liquid therethrough prior to incipient vortexing and sufficient to exclude the flow of undesired gaseous material with the liquid there-through.

Other objects and advantages of this invention will become more apparent from the following description.

This invention relates to the method and means for rapidly transferring a measured amount of liquid from one liquid containing zone to another at flow rates up to about 1000 gallons per minute to the exclusion of an undesired gaseous or vaporous material and automatic flow control means for reducing the flow of the liquid to the measuring device prior to a condition of incipient liquid vortexing.

The method and means of this invention is more clearly understood by reference to the attached drawings and description thereof presented hereinafter. In the drawings:

FIGURE I is a diagrammatic illustration in elevation of the liquid metering system of this invention.

FIGURE II is a diagrammatic illustration in elevation of the sensing means comprising a pressure balanced valve assembly employed in the system of this invention.

FIGURE III is a diagrammatic illustration in elevation of the liquid metering system of this invention as installed on a tank truck.

Referring now to FIGURE I by way of example, a tank 2 containing liquid 4 is provided. Conduit 6 is provided to fill and/or vent tank 2 as desired. Conduit 8 containing valve 10 is provided for passing liquid 4 to flow meter 12. Flow meter 12 is a positive displacement type flow meter for measuring the volume of liquid passed therethrough. The liquid then passes from flow meter 12 through conduit 14 containing coupling 16 to tank 18 containing liquid 20. Conduit 22 is provided for venting tank 18. The transfer of liquid from tank 2 to tank 18, as briefly outlined above, at flow rates from about 100 to about 1500 gallons per minute generally about 500 gallons per minute is confronted with aggravated problems related to eliminating transfer of air or undesired gaseous material with the liquid to and through the flow meter when the liquid level in tank 2 approaches a relatively low level and a level promoting a condition of vortexing at the inlet to the discharge conduit 8. To eliminate a condition of vortexing in high rate liquid transfer systems and provide a system which will automatically sense incipient vortexing applicants have provided a pressure balance sensing means 24 associated therewith which is adjusted to be pressure responsive to a head of liquid just prior to a condition of incipient vortexing whereby a normally closed relief valve in the sensing means 24 is automatically opened to vent atmospheric air to conduit 14 by conduit 26 and conduit 28 to instantaneously break the negative pressure existing in conduit 14 and simultaneously reduce the rate of flow of the liquid withdrawn from dispensing tank 2 to a liquid flow rate below that causing a condition of vortexing. By reducing the liquid flow rate just prior to emptying of the tank below that causing a condition of incipient vortexing the passage of gaseous material to and through the flow meter is eliminated thereby avoiding inaccurate liquid flow meter measurements and damage to the flow meter. Furthermore, by arranging the piping of the discharge system so that the flow meter discharges against a liquid pressure head, complete emptying of the flow meter and liquid manifold feeding thereto is avoided thereby eliminating the need for priming the flow meter before reuse.

Referring now to FIGURE II the sensing means comprising a pressure balanced valve assembly is shown. The sensing means comprises a housing or body 24 adapted to contain a plurality of pressure balanced chambers separated by a plurality of flexible diaphragms which are rigidly attached to a movable valve assembly and the housing of the sensing means so that the movement of the valve in an open or closed position may be biased as desired by an adjustable tension providing means in response to predetermined desired pressures.

That is, the housing or body of the sensing means 24 is provided with an air passageway comprising an air inlet 30 and outlet 32 separated by valve seat 34 which is engaged by a closure plate seal member 36 of a valve assembly more fully described hereinafter. The above described air passageway is formed and confined within the upper part of the housing 24 and is separated from the lower part of the sensing means by a relatively small flexible diaphragm 38. Positioned beneath and spaced apart from diaphragm 38 is a second larger flexible diaphragm 40 arranged to form there between a sealed pressure chamber 42. A chamber 44 formed between diaphragm 40 and the bottom of housing 24 of the sensing means is provided with an open passageway 46 through the housing. The valve assembly 48 employed in the sensing means of this invention is formed by the assemblage of a plurality of component parts as follows. An upper valve stem 50 is provided and assembled as shown to include a disk washer support plate 52, seal washer 36, retaining washer 54 and a retaining nut 56. The upper end of valve stem 50 is aligned with a guide passageway 58 extending into a threading cap body 60 to maintain the position of the valve 48 with respect to the valve seat 34 in proper alignment. The cap body 60 provided with a lock nut 62 and suitably threaded extends downwardly through the housing 24 and provides means for adjusting the tension of a spring 64 extending between the bottom of cap 60 and retaining washer 54. The lower end of the valve stem body 50 is threaded and of a length sufficient to extend through the center of the relatively small diaphragm 38 which is rigidly attached at its periphery to the housing 24 by a back-up annular ring 66 and an annular lock ring 68. The inside diameter of lock ring 68 is sufficiently large to permit withdrawal of the upper valve assembly as a unit including support washer 52 if desired. The lower stem body 70 with the aid of spacer rings 72 and upon proper assembly of threaded body 70 to the lower threaded end of body 50, rigidly attaches the center portion of diaphragm 38 to the valve stem as shown. Diaphragm 40 positioned below diaphragm 38 is rigidly attached at its periphery between matching sections of the housing at its periphery with the aid of a sufficient number of screws and lock washers as represented by 74. A rigid diaphragm plate 76 of smaller diameter than the maximum diameter of diaphragm 40 is employed adjacent to a central annular portion of diaphragm 40 to maintain a desired rigidity to the flexible diaphragm. Diaphragm 40 and plate 76 is rigidly attached at the center thereof to the valve body 70 by retaining washer 78, lock washer 80 and retaining nut 82 as shown. The bottom end of the valve assembly stem which is the bottom portion of body 70 extends into a guide passageway 84 provided in the bottom of the housing 24. Passageway 84 is co-axially aligned with passageway 58 in the upper portion of the housing to restrict movement of the valve assembly 48 within a desired plane of movement. In the arrangement shown in FIGURE II the valve assembly will move in a vertical direction only.

Provisions are made for rigidly attaching the housing 24 of the sensing means to a flange assembly 86 provided with open passageway 88 and 90 communicating between an L shaped inlet means 92 and open passageway 46. The flange assembly 86 is inserted in or made a part of the liquid transfer conduit between suitable connecting flanges so that the L shape inlet means 92 will extend into the moving fluid in the manner of a Pitot tube.

Referring now to FIGURE III there is shown diagrammatically a typical installation of the liquid transfer-air eliminator system of this invention installed on a tank truck for carrying and dispensing petroleum liquids such as product liquids including gasolene, fuel oil etc., therefrom at a high flow rate. A truck tank 100 is shown from which liquid is to be transferred by outlet 102 through conduit 104 communicating with flow meter 106. Conduit 104 is provided with couplings 108 and 110 therein and a valve means 112. A flange assembly 86 attached to sensing means 24 similar to that discussed in connection with FIGURE II is positioned within conduit 104 in between valve 112 and flow meter 106. An air inlet conduit 114 positioned and coupled as shown, similar to conduit 26 of FIGURE I, is provided for admitting vent air to the sensing means 24 (inlet 30 as discussed with respect to FIGURE II). Conduit 116 similar to conduit 28 FIGURE I is provided for passing vent air from the sensing means 24 (outlet 32 as shown in FIGURE II) to a liquid discharge conduit 118 downstream of flow meter 106. It is clear from the above that FIGURE III presents a practical application of the method and means described hereinbefore and the operational understanding thereof is benefitted by the diagrammatic illustration and description of FIGURES I and II.

The method and means of this invention may be employed in a wide variety of applications in the petroleum, chemical, and other industries which have a need for transferring measured amounts of a liquid at high liquid flow transfer rates of from about 300 gallons per minute up to about 1000 gallons per minute or higher from one liquid containing zone to another and this may be accomplished in a gravity flow system as particularly described herein or by a pressure-pump system.

It is contemplated employing, as embodiments of the control system herein described, liquid level detecting means including float operated switches and valves; pressure switches; solenoid operated valves; temperature, pressure and sonic transducers or other suitable liquid level detecting means positioned either within the tank containing the liquid or adjacent the discharge conduit inlet leading from the tank to trigger or actuate a circuit for the air bleed valve control and any one of these detecting and actuating means may be implemented by an electrical or pressure supported system. That is, it is contemplated employing an electrical liquid level detecting means in the liquid in the tank adjacent the inlet to the transfer conduit leading therefrom which will electrically actuate a suitable vent valve in the manner of this invention.

In the method of this invention it is particularly desirable although not essential, to have a portion of the liquid transfer conduit downstream of the flow meter at a sufficiently high elevation above the elevation of the meter discharge so that liquid will be retained in the transfer conduit and particularly the flow meter in an amount which will preclude the necessity of priming the meter with liquid before use.

Having thereby set forth a general description of the improved method and means of this invention and described specific embodiments and arrangements thereof, it is to be understood that no undue restrictions are to be imposed by reasons thereof and minor modifications may be made thereto without departing from the spirit and scope of the invention.

We claim:

1. A system for transferring liquid from one vessel to another in measured amounts which comprises a first vessel containing liquid, a second vessel for receiving liquid, a flow meter, a first conduit communicating between said first vessel and said flow meter, a second conduit communicating between said flow meter and said second vessel, an automatic control means comprising pressure responsive chambers separated by two superposed flexible diaphragms rigidly attached to a gas flow control valve therein, one of said flexible diaphragms being small and being normally operationally sealed from the atmosphere through a valve means attached thereto, the other of said diaphragms being larger and being connected to said first conduit, one side of said valve means being vented to the atmosphere with the opposite side of said valve means adjacent said flexible diaphragms being connected to said second conduit, said valve means being normally operationally closed to flow of gases there-through under conditions of high pressure due to high liquid flow rate between said vessels and opened to flow of gaseous material responsive to a predetermined lowering of said pressure in said first conduit due to incipient vortexing in said first vessel.

2. A pressure responsive valve means comprising in combination, a housing separated into an upper chamber, an intermediate chamber and a lower chamber, said lower chamber separated from said intermediate chamber by a large flexible diaphragm and connected by a first open passageway extending through the housing, said intermediate chamber sealed and separated from the upper chamber by a small flexible diaphragm, said upper chamber provided with a gas inlet passageway and a gas outlet passageway separated by a passageway, a valve in said passageway, the stem of said valve being rigidly attached to said flexible diaphragms, and a variable biasing means urging said valve toward a closed position.

References Cited in the file of this patent

UNITED STATES PATENTS

| | | |
|---|---|---|
| 1,795,201 | Dashwood | Mar. 3, 1931 |
| 1,935,667 | Renfrew | Nov. 21, 1933 |
| 2,186,069 | Hazard | Jan. 9, 1940 |
| 2,365,650 | Shaw | Dec. 19, 1944 |
| 3,081,627 | Reed et al. | Mar. 19, 1963 |